(12) United States Patent
Blegen et al.

(10) Patent No.: US 7,293,072 B2
(45) Date of Patent: *Nov. 6, 2007

(54) METHOD AND SYSTEM FOR MODIFYING HOST APPLICATION FUNCTIONALITY BASED UPON DOWNLOADED CONTENT

(75) Inventors: Darrel L. Blegen, Redmond, WA (US); Hugh Rubin, Seattle, WA (US); Derek Hazeur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 10/861,692

(22) Filed: Jun. 4, 2004

(65) Prior Publication Data

US 2004/0220936 A1 Nov. 4, 2004

Related U.S. Application Data

(63) Continuation of application No. 09/349,583, filed on Jul. 9, 1999, now Pat. No. 6,757,716.

(51) Int. Cl.
G06F 15/16 (2006.01)
G06F 3/048 (2006.01)

(52) U.S. Cl. .................. 709/217; 709/219; 715/808; 715/825; 715/840

(58) Field of Classification Search .......... 709/217, 709/218, 219, 203; 715/808, 825, 840
See application file for complete search history.

(56) References Cited

U.S. PATENT DOCUMENTS

| 5,533,180 A | 7/1996 | Zhou et al. |
| 5,870,559 A * | 2/1999 | Leshem et al. ............. 709/224 |
| 5,923,885 A | 7/1999 | Johnson et al. |
| 5,958,008 A * | 9/1999 | Pogrebisky et al. ........ 709/223 |
| 5,987,480 A | 11/1999 | Donohue et al. |
| 6,023,708 A | 2/2000 | Mendez et al. |
| 6,035,332 A | 3/2000 | Ingrassia, Jr. et al. |
| 6,064,979 A | 5/2000 | Perkowski |
| 6,085,229 A | 7/2000 | Newman et al. |
| 6,088,717 A * | 7/2000 | Reed et al. ................. 709/201 |

(Continued)

OTHER PUBLICATIONS

Harris, Brad and Bill Vernon. The Big Guide to Netscape Communicator 4. Sams.net publishing. 1997, First edition. 589-603.*

(Continued)

Primary Examiner—Jason Cardone
Assistant Examiner—Jeffrey R Swearingen
(74) Attorney, Agent, or Firm—Workman Nydegger

(57) ABSTRACT

An application hosting a browser modifies its own functionality in some manner based on whether particular content (e.g., an identifier) is present in a document for rendering by the browser. In one embodiment, a financial statement page for rendering via the hosted browser is scanned to determine if an identifier corresponding to a download button is present. If present, the host application provides an alternate download button that does not scroll off the screen as the page is scrolled. The present invention also suppresses a dialog box (e.g., the open/save dialog box) when a request for a certain file type is made by a hosted browser. For example, a request for download of financial information suppresses the open/save dialog box, and automatically opens the downloaded file.

7 Claims, 7 Drawing Sheets

U.S. PATENT DOCUMENTS

| | | |
|---|---|---|
| 6,101,510 A | 8/2000 | Stone et al. |
| 6,188,401 B1 | 2/2001 | Peyer |
| 6,205,432 B1 | 3/2001 | Gabbard et al. |
| 6,266,664 B1 | 7/2001 | Russell-Falla et al. |
| 6,266,681 B1 | 7/2001 | Guthrie |
| 6,292,185 B1 | 9/2001 | Ko et al. |
| 6,311,185 B1 | 10/2001 | Markowitz et al. |
| 6,317,782 B1 | 11/2001 | Himmel et al. |
| 6,401,077 B1 | 6/2002 | Godden et al. |
| 6,421,694 B1 | 7/2002 | Nawaz et al. |
| 6,421,706 B1 * | 7/2002 | McNeill et al. ............. 709/217 |

OTHER PUBLICATIONS

Stotts, P. David et al. "Hyperdocuments as Automata: Verification of Trace-Based Browsing Properties by Model Checking." ACM Transactions on Information Systems. vol. 16, Issue 1. Jan. 1998. pp. 1-30. ACM Press.*

Shiode, Narushige et al. "Utilising the Spatial Features of Cyberspace for Generating a Dynamic Museum Environment." Proceedings of the Fourth Symposium on Virtual Reality Modeling Language. pp. 79-84. ACM Press, no date found.*

Dourish, Paul et al. "Presto: An Experimental Architecture for Fluid Interactive Document Spaces." ACM Transactions on Computer-Human Interaction. vol. 6, Issue 2. Jun. 1999. pp. 133-161. ACM Press.*

* cited by examiner

METHOD AND SYSTEM FOR MODIFYING HOST APPLICATION FUNCTIONALITY BASED UPON DOWNLOADED CONTENT

CROSS-REFERENCE TO RELATED APPLICATION

This application is a continuation of U.S. patent application Ser. No. 09/349,583, filed Jul. 9, 1999, now U.S. Pat. No. 6,757,716.

FIELD OF THE INVENTION

The present invention generally relates to computer systems, and more particularly to application programs and the downloading of data from a remote server.

BACKGROUND OF THE INVENTION

Present financial programs, i.e., personal finance managers such as Microsoft Corporation's Money and Intuit's Quicken programs, permit the download of financial transaction history (or statement data) from Internet banking web sites. The transaction history is made available to a user via a secure statement detail page on a financial institution's secure web site. For example, such programs may host an in-situ browser that permits viewing and synchronizing of the financial institution information from within the program. To this end, when the user requests transaction data from a financial institution, the application hosts a browser to render a page provided by the financial institution's server that includes the transaction data.

To synchronize with a personal finance manager's existing financial data for that user, a download button is provided on the statement detail web page, the clicking of which downloads transaction history detail from the web site for reconciliation. One problem with this mechanism is that users often cannot easily find the download button, for example when the user has so many transactions that the button is scrolled off the visible portion of the rendered page.

SUMMARY OF THE INVENTION

The present invention is directed to a method and system wherein a recognition mechanism determines whether particular content (e.g., an identifier) is present in a document downloaded for rendering by a hosted browser. If the particular content is present, the application hosting the browser modifies its own functionality (e.g., behavior) in some manner.

In one embodiment, a hosted browser control scans a page to search for an identifier corresponding to a download button. If present, the host application is notified, and modifies its functionality by providing a notification/activation mechanism in the form of an alternate download button for display. The alternate download button does not scroll off the screen as the page is scrolled. Alternative ways in which an application may alter its operation when an identifier is present include, for example, changing the characteristics such as the color of the application window surrounding the hosted browser, changing the default language, and so forth. Logical combinations of multiple identifiers may also be used to determine changed functionality, e.g., do something else if both identifier "a" and identifier "b" are present in a page.

The present invention also suppresses a dialog box (e.g., the open/save dialog box) when a request for content is made by a hosted browser. In the example described above, a request for download of financial information suppresses the open/save dialog box, and automatically opens the downloaded document.

Other advantages will become apparent from the following detailed description when taken in conjunction with the drawings, in which:

DETAILED DESCRIPTION

Exemplary Operating Environment

Figure 1:
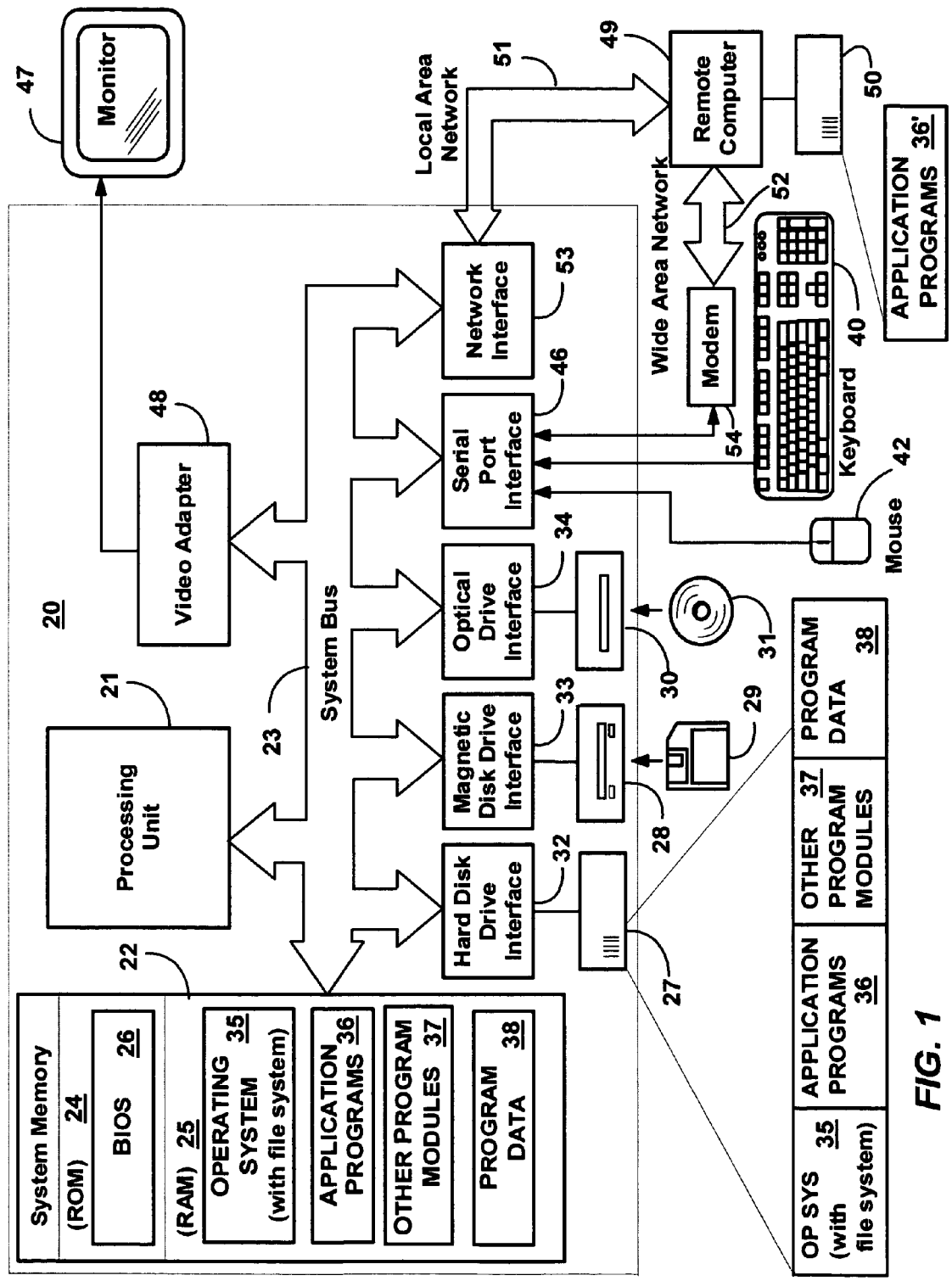
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Modifying Host Application Functionality

In general, the present invention provides a method and system via which a client application 60 (FIG. 2) of a client machine (such as the personal computer 20) selectively modifies its functionality based on the presence of particular content in a document for rendering via a hosted (in-situ) renderer, such as a browser control 62. As used herein, "browser control" includes the one or more components that handle the interpretation, rendering and/or other handling of content, typically in a downloaded HTML document. To determine when to modify its functionality, as described in detail below, the application 60 includes a recognition/functionality modification mechanism 61 that communicates with the browser control 62 to determine whether the particular content (e.g., an identifier) is present. If the particular content is present, the application 60 alters its functionality, for example by providing a notification/activation mechanism 82 (FIG. 3A) for display on the browser.

While the present invention was originally implemented in a financial environment and thus includes financial-based client and server examples, it should be understood that the present invention is not limited to financial applications, but instead has numerous applications throughout user computing. Moreover, although the various components are shown and described herein as separate components because of certain benefits resulting from separated functionality, it can be readily appreciated that some or all of the components may be combined into more complex components, and/or separated even further into additional components.

Figure 2:
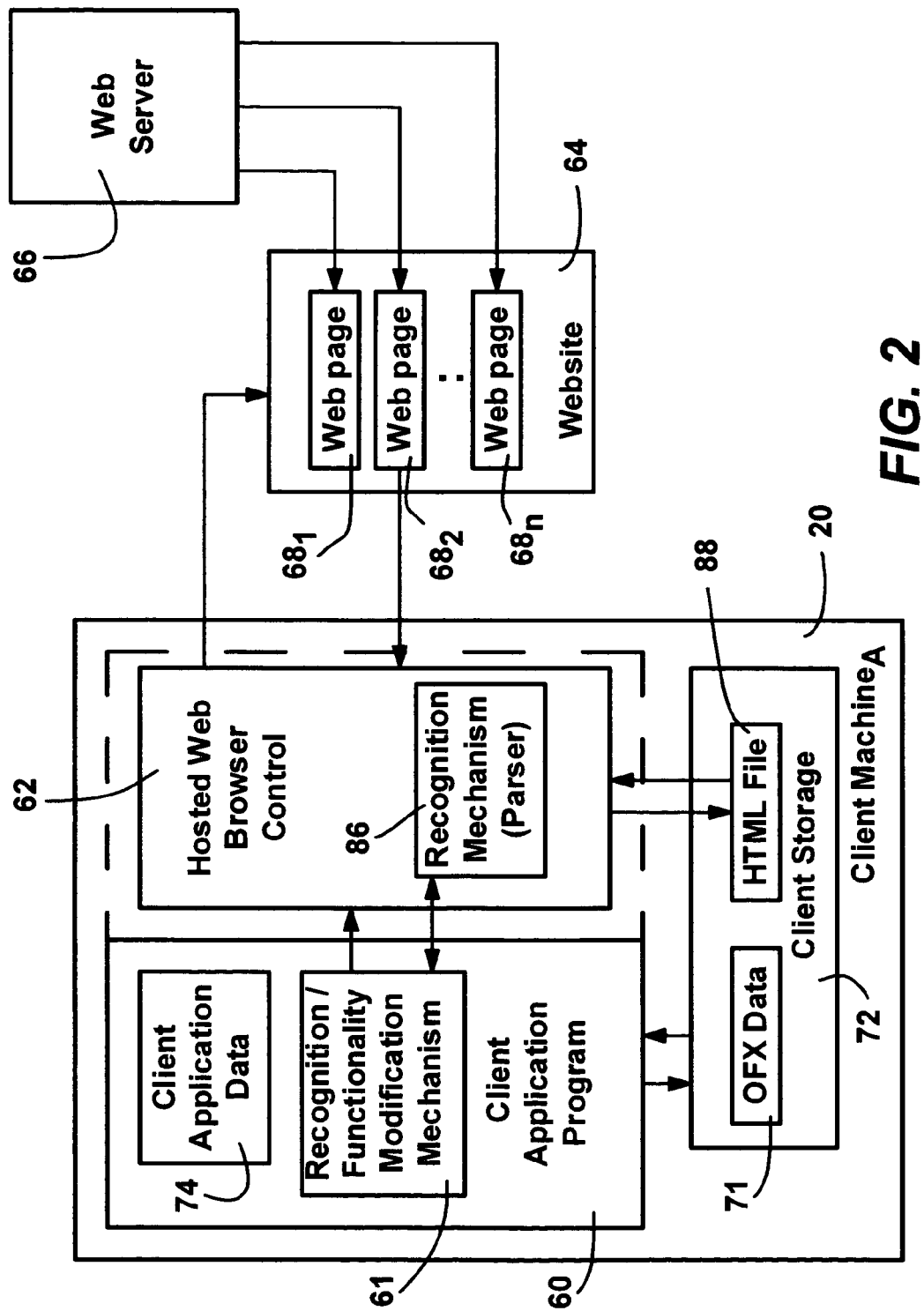
FIG. 2 is a block diagram representing a general architecture for modifying a host application's functionality based upon downloaded content.

As represented in FIG. 2, the client application 60, such as Microsoft® Corporation's Money99, hosts the web browser control 62 (in-situ), such as Microsoft® Corporation's Internet Explorer. This occurs when a user of the application 60 clicks on an appropriate link within the application 60, or by initiating the browser in another suitable manner. For example, from within Microsoft® Corporation's Money99 program, the user can click on a "Go to Web" link from a financial institutional dialog box. Clicking on the "Go to Web" link launches the in-situ browser control 62, whereby the user visits a financial institution's website (e.g., the website 64) via the browser control 62. The financial institution can be a bank, a brokerage, a credit union, or the like, which typically authenticates the user in a known manner, such as via an authentication page.

When the user is authenticated, the web browser control 62 accesses a website 64 of a web server 66 (such as the remote computer 49) to enable users to view web pages $68_1$-$68_n$. By way of example, one such web server (e.g., the web server 66) may provide electronic bank statements via the website 64. If more than one account is available for this user, then the user selects a particular account. The financial institution processes the request by creating a personalized a list of the user's transactions for that account on one of the web pages, e.g., the page $68_2$, whereby the user can see a rendered list of transactions (e.g., a bank statement). Note that although only one web server 66 and website 64 are shown in FIG. 2, it is understood that the web pages $68_1$-$68_n$ shown in the website 64 may be distributed among many websites and/or servers. A user could also access separate statements or web pages from various financial institutions, each of which could provide one or more servers and/or websites.

Figure 3A:
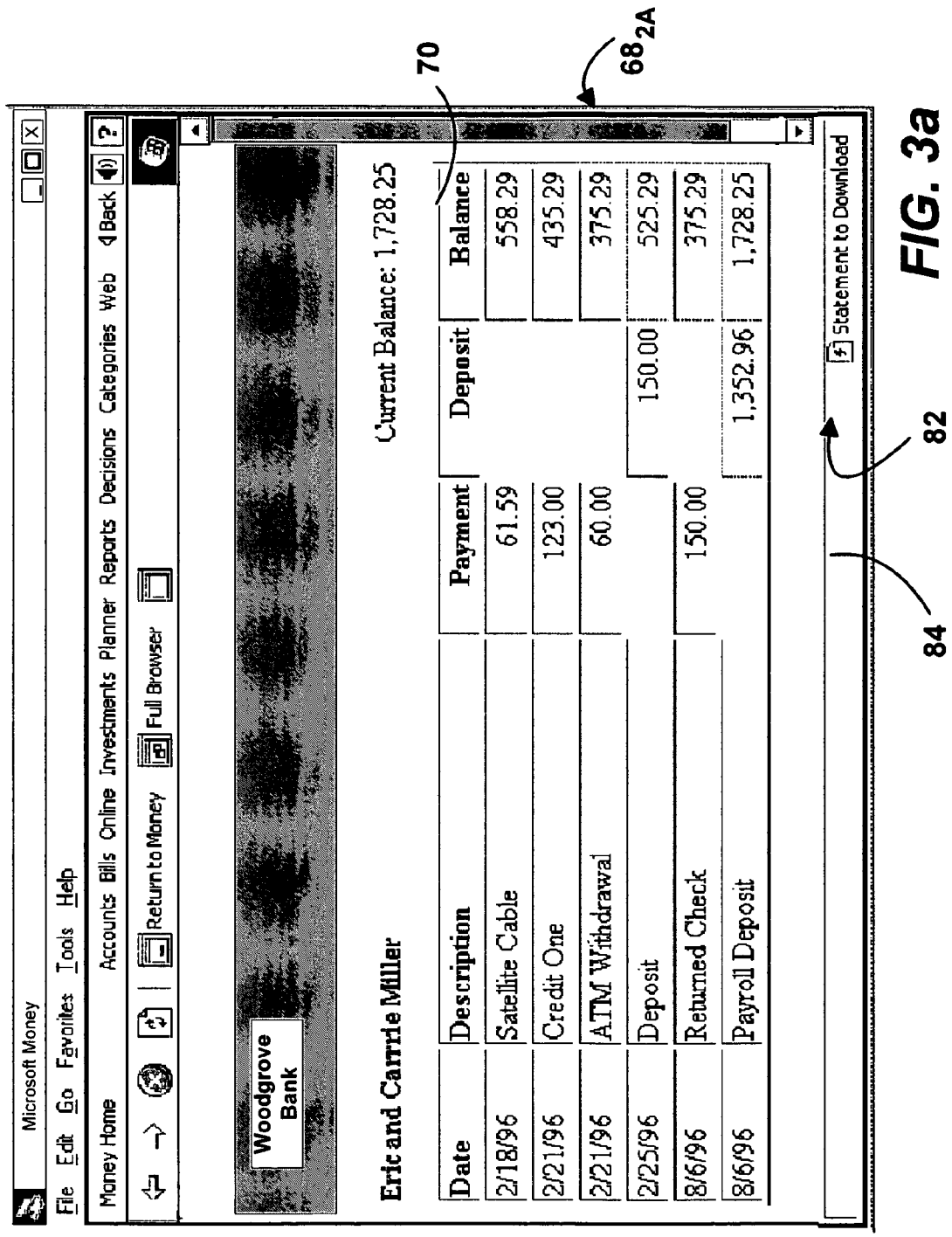
FIG. 3a is a representation of a web page document rendered via an in-situ browser.

As represented in FIG. 3a, an example web page $68_{2A}$ is rendered by the in-situ browser control 62. The page represents a list of transactions from one of the user's accounts (e.g., including a statement portion 70 from a bank). The rendered statement 70 can represent a checking account, savings account, investment account, and so forth, generally ordered by date. The statement is preferably provided in HTML, but may be provided in alternate formats understood by a browser.

In this manner, the application 60 allows the user to view the rendered web page statement 70 without leaving the application program 60. Moreover, if transaction data is available that has not been previously downloaded, then that data (e.g., OFX data 71, FIG. 2) may be downloaded to the user's client-side storage 72 such as a hard drive 72. The downloaded data 71 is later (or concurrently) imported by the application 60, and then synchronized/reconciled with existing client application data 74.

If transactions are available for download, the web page $68^{2A}$ includes a visible button via which the user initiates the download. For example, in Money99, a button 76 (FIG. 3b) is provided at the end of the web page $68_{2A}$, bearing the label "Download to Money." Clicking the pointing device 42 when on the button 76 initiates the statement download.

Figure 3B:
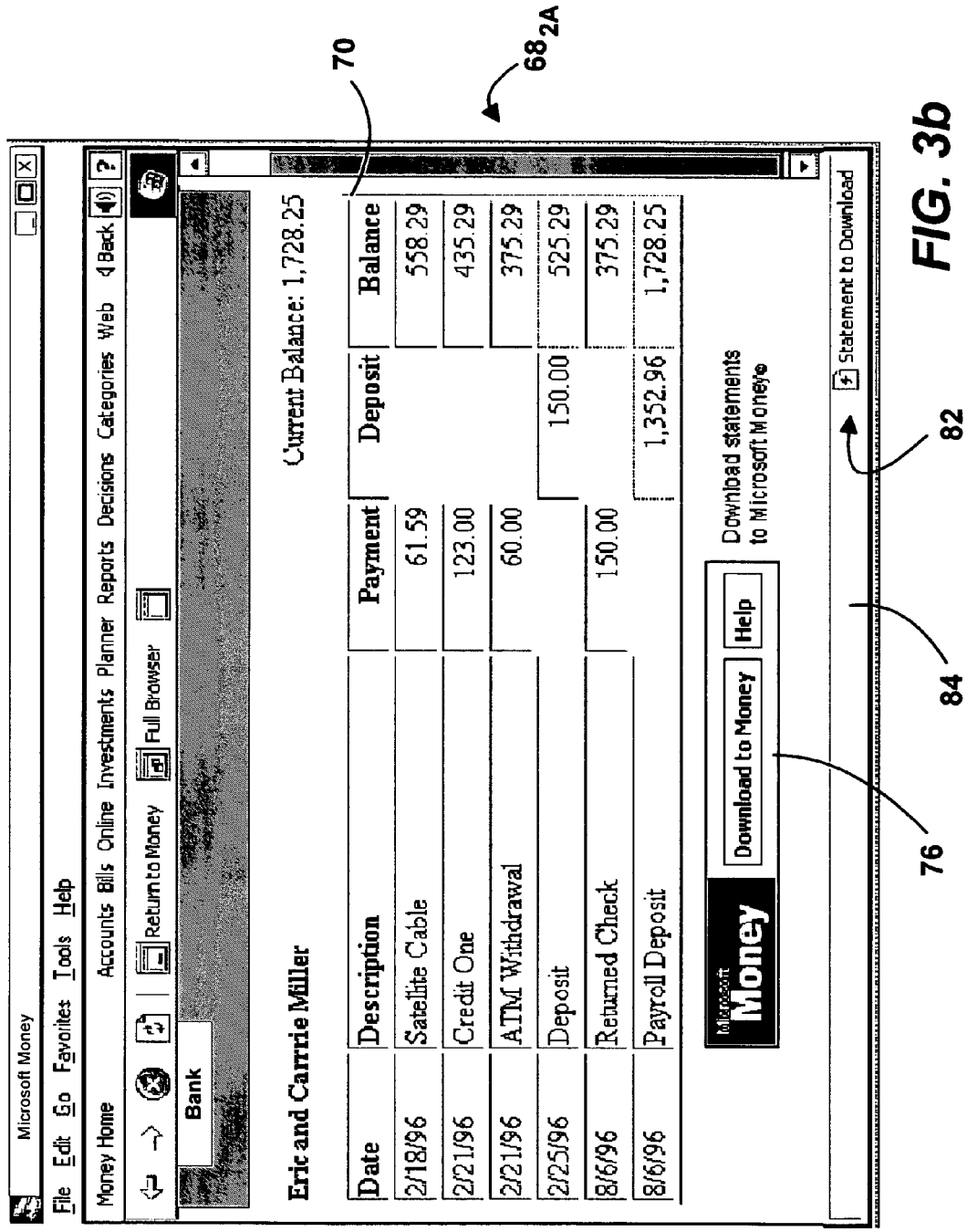
FIG. 3b is a representation of the web page document of FIG. 3a, with the web page scrolled toward the end of the document.

As can be seen in FIGS. 3a and 3b, the "Download to Money" button 76 may not be visible at times to a user viewing the web page $68^{2A}$, for example because the button is scrolled beyond the viewable portion of the web page (FIG. 3a). To view the "Download to Money" button 76, the user is required to scroll to the bottom of the page (FIG. 3b). However, having to scroll to the "Download to Money" button 76 makes the button difficult to find for many users.

In accordance with one aspect of the present invention, the hosting application 60 selectively alters its functionality in some manner based on the presence (or absence) of particular content, for example, to facilitate the downloading operation. In the present example, the present invention provides the notification/activation mechanism 82 (FIG. 3a) in the form of a clickable icon for downloading. The icon is selectively provided by the application 60 such that is it displayed only when downloading is possible, yet it is displayed in a manner that is independent of page scrolling. To this end, as shown in FIGS. 3a and 3b, when a financial statement page may be downloaded for reconciliation, the notification/activation mechanism 82 (downloading icon) is displayed on an area of the display screen that does not scroll off the screen as the page is scrolled, e.g., on a lower browser bar 84. Like the "Download to Money" button 76, the download icon 82 indicates that downloadable content is available. As is described in detail below, clicking on the icon 82 similarly causes the "Download to Money" button 76 to be executed (i.e., initiates downloading of transaction data).

To determine when to selectively alter its functionality and display the icon, the browser control 62 includes a parser mechanism 86 (FIG. 2) that searches a downloaded document for the particular content. If found, the parser mechanism 86 provides a notification to the recognition/ functionality modification mechanism 61 of the application 60. For example, the application 60 may register with the browser control 62 for such a notification, and thereby inform the browser control 62 of the particular content for which to search.

Alternatively, the browser control 62 can provide the application 60 with the file name of the downloaded HTML file 88 (corresponding to the page $68_{2A}$), or the data (e.g., text) therein, whereby the application 60 may perform its own search. Other recognition mechanisms/techniques may be utilized to determine whether an identifier or particular content is present on a web page or document. For example, the application 60 can call into the browser control 62 to request a search and a response to the search indicating whether the particular content was found. As used herein, the term "recognition mechanism" is intended to include at least these alternatives, and thus "recognition mechanism" refers to any component (code) in the application and/or the hosted browser control that takes some action with respect to the particular content that will cause functionality modification. For example, a component of the recognition mechanism in the application determines whether to modify functionality, while a recognition mechanism component in the browser control may scan the content for the particular identifier, or alternatively provide the content to the application for scanning.

In the present example, the particular content to search for is a text string (HTML tag)—ID="DownloadOFX"—that a server includes in the page as an HTML tag whenever content is downloadable. Each web page (e.g., the web page $68_{2A}$) that is displayed by the in-situ browser control 62 may be parsed by the recognition (parsing) mechanism 86 to determine whether the ID="DownloadOFX" HTML tag is located on the web page. If a determination is made that the ID="DownlbadOFX" HTML tag is present, the browser control 62 notifies the host application 60, whereby the application alters its functionality, in this example by providing the activation/notification icon 82. For example, the application may provide the icon 60 by calling a method of the browser control 62. If the ID="DownloadOFX" HTML tag is not available, then the application's functionality is not altered (i.e., the icon 82 is not provided for the user.

Figure 4:
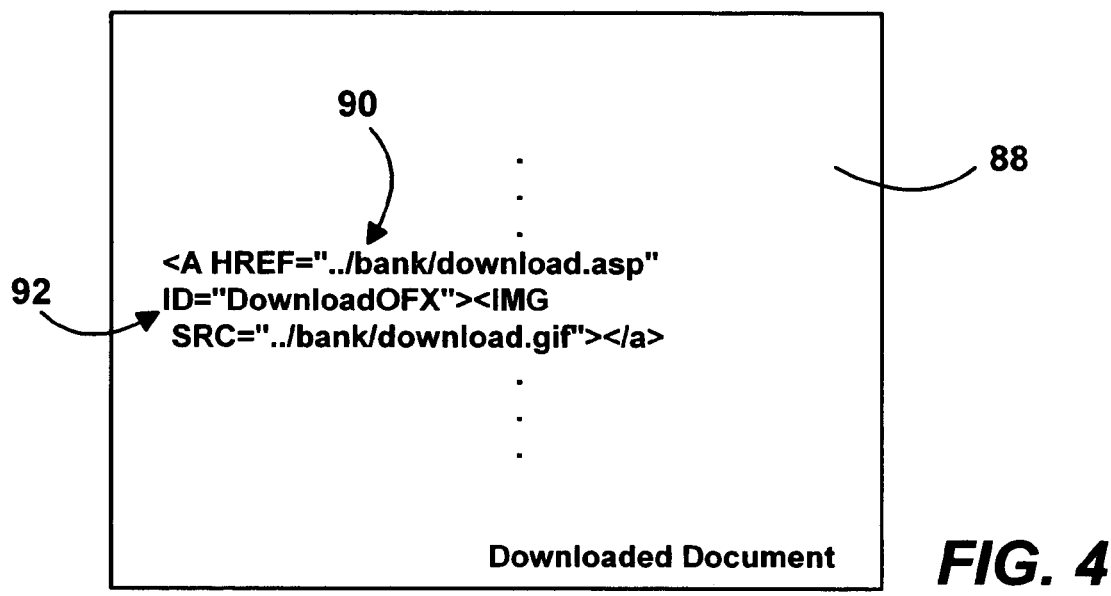
FIG. 4 is a representation of a portion of an HTML file corresponding to the web page of FIGS. 3a and 3b.

For example, as shown in the partially represented HTML file 88 of FIG. 4, the content includes an HREF tag 90 for defining and placing the "Download to Money" button 76, and further includes an ID="DownloadOFX" HTML tag 92. Because of the presence of the ID="DownloadOFX" HTML tag 92, the download icon 84 will be displayed as described above. As can be appreciated, the decision whether to modify the application's functionality is made at the server 66 end, by including or excluding the particular content on a per-page basis, and is also relatively trivial to implement from the server-side perspective. At the client end, the application 60 determines what modification to make to its functionality. For example, an application may alter its operation based on particular content to change some other visible characteristic such as the color of an application window surrounding a hosted browser window. A language-related tag may be inserted to change the default language, and so forth. As can be readily appreciated, virtually any type of modification is feasible.

It should be noted that when the search fails to find a particular identifier or other particular content within a document or web page, then the functionality of the application may instead be modified accordingly. In other words, it is essentially equivalent to have the application alter its functionality based on the absence rather than the presence of particular content. Moreover, the recognition mechanism may search for multiple identifiers or other content, e.g., a search may be performed for an identifier "a" and an identifier "b." Multiple identifiers may be logically combined, e.g., by the recognition mechanism (parser) 86 or alternatively by the recognition mechanism 61 if the browser control 62 notifies the application of the multiple identifiers that were found, whereby the application 60 can provide the logic for modifying its functionality. For example, the functionality may be modified only when both identifier "a" AND identifier "b" are present. As another example, functionality may be modified a first way when identifier "a" is present, a second way when identifier "b" is present, and a third way when both identifier "a" AND identifier "b" are present, but NOT if identifier "cc" is present. As can be appreciated, a vast number of permutations and combinations are possible.

When a user initiates a download, the financial institution (e.g., its web server 66) builds a transactions data file in a format that is recognized by the application 60. For example, for transactions data files that are downloaded into Money99, the data is formatted in an "OFX" format, and the file named with an "ofx" extension. The transactions data file is then ready to be downloaded to the user's machine 20.

As is known, when a data file 71 is downloaded from a remote source such as the remote server 66, a browser such as the web browser control 62 ordinarily provides a open/save dialog box, which permits the user to select between opening the file from its present location, or saving the file to a hard disk or other medium. Preferably, in a financial application such as Money99, the file is opened rather than saved, so that the application can process it, either immediately or later, e.g., the next time the application is started. Otherwise, if saved, the application will not know the file location and thus will be unable to process the file.

To ensure that the data file is opened, the present invention provides automatic opening of files having selected extensions, while suppressing the open/save dialog box. To this end, the system registry is automatically modified (typically when the application program 60 is installed) so that data file types with the appropriate extension, e.g., the "ofx" extension, are downloaded without the open/save dialog box option being provided. Altering the registry in this manner can be accomplished by setting the appropriate bit values in the appropriate registry key. Registry keys for Internet Explorer, for example, are defined by the following format:

HKEY_CLASSES_ROOT\filetype,attributes

For the "ofx" extensions described above, the registry key is:

HKEY_CLASSES_ROOT\ofx.Document

For that registry key value, the DWORD for EditFlags is set to 00 00 01 00. This causes files with the extension "ofx" to be opened, without the open/save dialog box being presented to the user. By setting the appropriate bits relating to the handling of downloading of files having this extension, files requested for download with that extension will automatically be opened, and the open/save dialog box will not be provided (i.e., will be suppressed).

In this manner, once a download is requested, the transactions data file 71 having the selected extension is downloaded and saved to the client-side storage 72 without further user intervention. The application 60 then imports the file that has been downloaded, reconciling (i.e., synchronizing) each transaction in the file with existing application data 74, possibly allowing the user to control aspects of the reconciliation process, e.g., assign categories to each transaction as desired.

Figure 5:
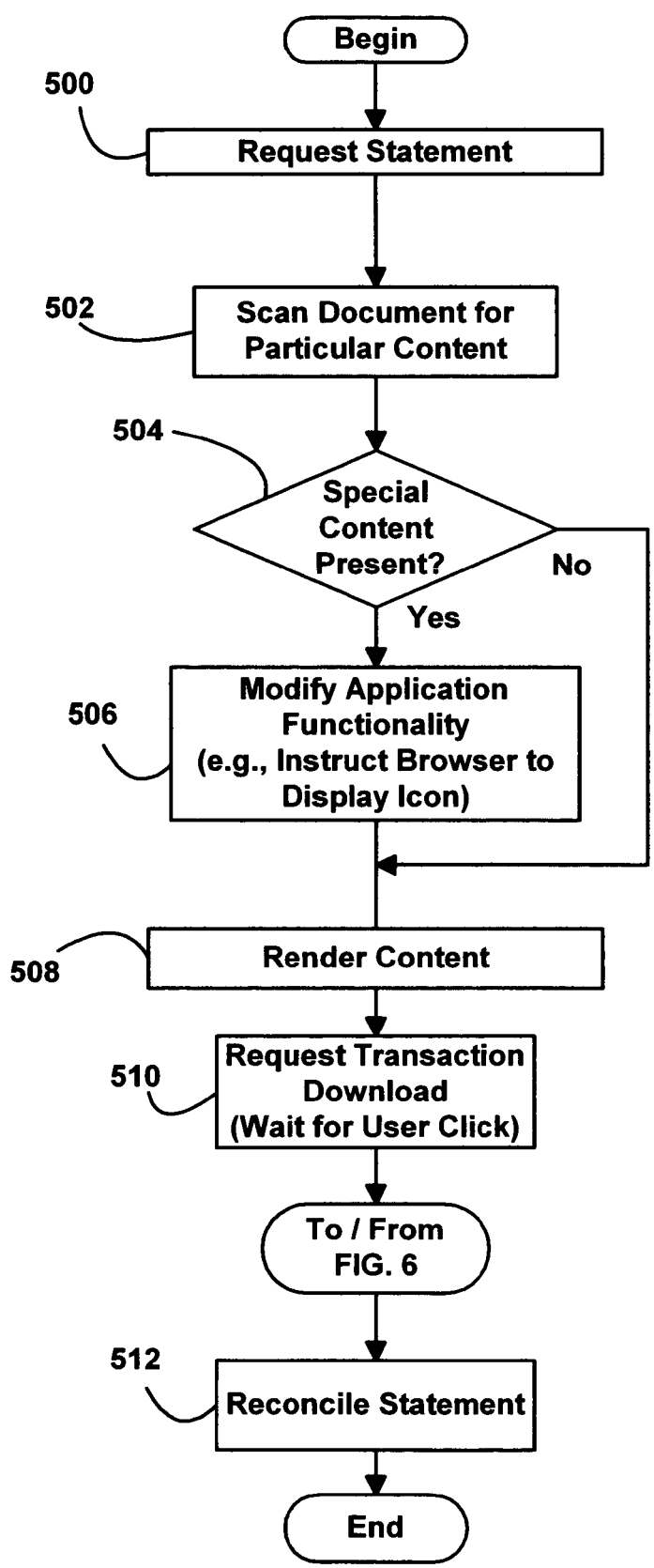
FIG. 5 is a flow diagram generally representing exemplary steps for selectively modifying a host application's functionality based upon particular content in accordance with one aspect of the present invention.

Turning now to an explanation of the operation of the present invention, FIG. 5 represents a general overview of a process for modifying the functionality of an application 60 (FIG. 2) that is hosting an in-situ browser control 62. Beginning at 500, an authenticated user navigating on the hosted browser control 62 requests a statement while at a financial institution web site (e.g., the web site 64).

Before the document is rendered, the document is scanned by the recognition mechanism (e.g., parser 86 of the browser control 62) for special content, e.g., the download identifier 92 (FIG. 4). Alternatively, scanning could occur after or during rendering. At step 504, a determination is made if the special content is present. As is described above, this determination is made by the recognition mechanism, e.g., the parser mechanism 86 conducts a text search of the HTML file 88, and reports the result (at least when found) to the recognition/functionality modification mechanism 61. If the special content is determined to be present, at step 506 the application 60 modifies its functionality accordingly, for example by instructing the browser control to display the notification/activation mechanism (icon) 82. If not found, then the application functionality is not modified. The statement (e.g., the statement 70) is then rendered by the browser control 62 at step 508.

In the financial example given above, the icon 82 is selectively displayed on the browser bar 84, providing an alternate download button that is displayed but does not scroll off of the screen as the page is scrolled. When downloading is enabled, at step 510, the transactions can be requested for download by either clicking on the icon 82 (i.e., clicking this icon executes the HREF associated with the ID tag), or by pressing the button 76 in the web page 68.

Figure 6:
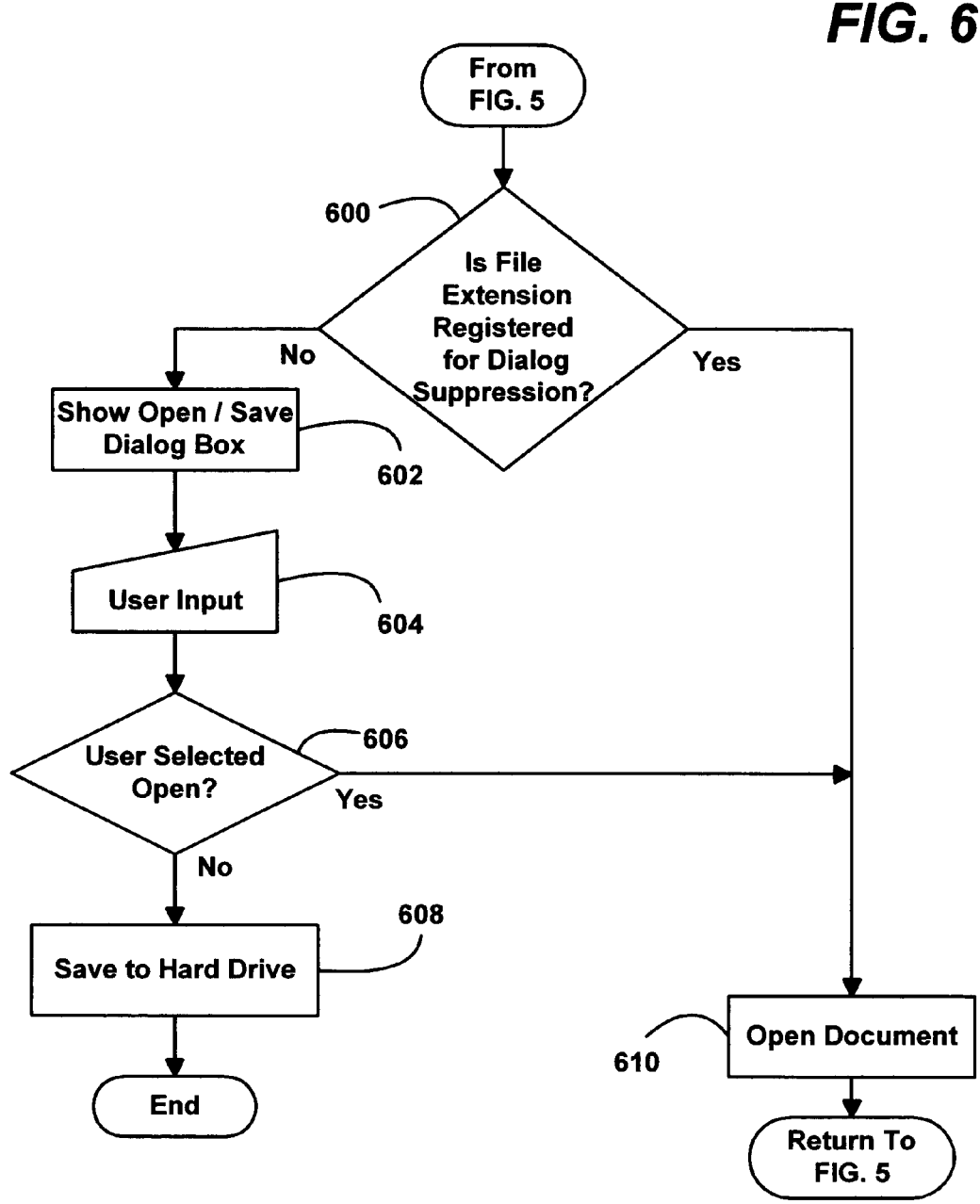
FIG. 6 is a flow diagram generally representing exemplary steps for suppressing an Open/Save dialog box in accordance with one aspect of the present invention.

FIG. 6 shows the general overview of a process for suppressing an open/save dialog box in accordance with one aspect of the present invention. After step 510 of FIG. 5, when transactions are requested for download, a determination is made at step 600 as to whether the file extension for the data file being downloaded is registered for dialog box suppression (e.g., the "ofx" file extension may be registered for dialog suppression). If so, step 600 branches to step 610, where the document is opened. Thereafter, returning to step 512 of FIG. 5, the downloaded transactions in file 71 (FIG. 2) are then reconciled with the client application data 74.

For completeness, steps 602-608 represent what occurs if the file extension is not registered for dialog box suppression, i.e., the open/save dialog box is presented to the user (step 602), and then user then selects either "open" or "save" (step 604). If the user selects "open," then step 606 branches to step 610 where the document is opened. If save is selected, the file is saved to the user's hard drive 72 at step 608, whereby, for example, the user will need to instruct the application 60 as to the location of the data.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer implemented method comprising:
the application accessing and hosting a browser control, which is independent of the application, and that is capable of accessing documents remotely stored from the application;
the application using the browser control to access a remotely stored document and to render content from the remotely stored document to a user, wherein the browser control parses the document and searches the document for a download button configured for display within the document and for downloading content associated with the download button;

the application receiving a notification from the browser control that the download button is found within the document, wherein the method further includes, in response to detecting the download button within the document, displaying a new and alternative download button that is selectable for downloading the content associated with the new and alternative download button.

2. A computer program product comprising one or more computer-readable storage media storing computer-executable instructions for implementing the method recited in claim 1.

3. A computer system comprising a processor and one or more computer-readable storage media storing computer-executable instructions that, when executed by the processor, implement the method recited in claim 1.

4. A method as recited in claim 1, wherein the new and alternative download button is displayed independently of page scrolling of the content from the remotely stored document, and such that the new and alternative download button remains in a same display position on a display interface even when the content from the remotely stored document is scrolled on the display interface.

5. A method as recited in claim 1, wherein the new and alternative download button is only displayed when it is determined that the content associated with the download button is available for downloading.

6. A method as recited in claim 1, wherein upon receiving the notification, the method further includes the application automatically suppressing a dialog box.

7. A method as recited in claim 1, wherein the particular identifier comprises the absence of predetermined content within the document.

* * * * *